Figure 1:
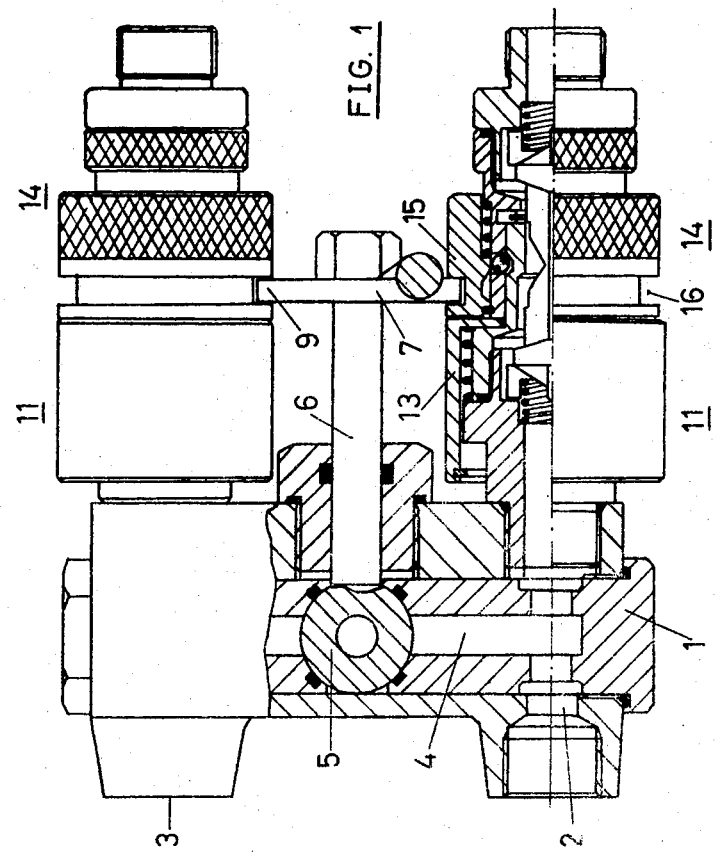

United States Patent  [15] 3,693,655
Frisk  [45] Sept. 26, 1972

[54] DEVICE FOR CONNECTION OF HYDRAULIC APPARATUSES
[72] Inventor: Knut Olov Frisk, Gavle, Sweden
[73] Assignee: AB Tico, Gavle, Sweden
[22] Filed: Dec. 16, 1970
[21] Appl. No.: 98,708

[30]     Foreign Application Priority Data
    Dec. 23, 1969    Sweden ................... 17914/69

[52] U.S. Cl. .........137/599.1, 137/614.06, 251/149.9
[51] Int. Cl. .............................................. F16l 37/28
[58] Field of Search .....137/599.1, 614.06; 251/89.5, 251/149.9

[56]    References Cited
    UNITED STATES PATENTS
2,638,915    5/1953    Mitchell ................. 137/599.1
3,544,063    12/1970    Barlow ................... 251/149.9

Primary Examiner—Robert G. Nilson
Attorney—Irving M. Weiner

[57]    ABSTRACT

Hydraulic connecting device with a pressure pipe speed coupling spigot, a return pipe speed coupling spigot, a cut-off valve between the pressure and return pipes, an actuator controlling said valve and a locking device coupled to the actuator which can be brought into mechanical engagement with each speed coupling spigot, the locking device being designed to prevent the cut-off valve to be closed before each of the speed coupling spigots is coupled to its associated speed coupling socket and that neither speed coupling spigot can be uncoupled from the associated speed coupling socket before the cut-off valve has opened.

5 Claims, 4 Drawing Figures

INVENTOR.
KNUT OLOV FRISK

DEVICE FOR CONNECTION OF HYDRAULIC APPARATUSES

The invention relates to a device for the alternative connection of various hydraulic apparatuses to a hydraulic pump, a piping system or the like, with pressure and return pipe sockets.

In the case, for example, of a vehicle with dismantlable, hydraulically driven implements, such as a loader, bucket, crane or the like, the hydraulic pump is usually driven by the vehicle's engine and is consequently placed on the vehicle. To permit dismantling and affixing of the implement and its coupling to the hydraulic pump, the pressure and return oil pipes are furnished with known speed couplings, so-called plug-in couplings. Such speed couplings can be coupled and uncoupled whenever desired. They may be uncoupled, for instance, even when oil is flowing in the pipes. But the oil flow is then forcibly interrupted, the speed couplings are self-closing in conjunction with uncoupling, and overloading of, and damage to the hydraulic pump and pipes may then arise. The provision of a safety valve which opens when a maximum permissible pressure is attained in the system is merely a partial solution and is attended by the drawback that the oil passes the safety valve at maximum permissible pressure, is decompressed, enters the return pipe and is led back through the pump to the safety valve at maximum permissible pressure. The work performed by the pump during this circulation is converted into heat and, with the relatively small quantities of pressure oil in question, this leads to a relatively quick heating of the oil unless countermeasures are taken in good time.

The same, or similar problems arise also in other contexts when a single hydraulic pump is to be connected first to one and then to a second hydraulically driven unit.

The object of the present invention is to remedy this drawback and to bring about a suitable solution which allows coupling and uncoupling without thereby causing pressure loads on the hydraulic system or parts of it.

This is achieved according to the invention by a device to connect hydraulic apparatuses to a hydraulic pump, a piping system or the like with pressure and return pipe sockets, a speed coupling spigot for the pressure pipe, a speed coupling spigot for the return pipe and, a cut-off valve placed between the pressure and return pipes. An actuator controls the cut-off valve, and a locking means coupled to the actuator and mechanically engageable with each speed coupling spigot, is so formed that the cut-off valve cannot be closed until the speed coupling spigot both for the pressure and return pipes is coupled to the associated speed coupling socket, and that neither speed coupling spigot can be uncoupled from the associated speed coupling socket before the cut-off valve is opened.

According to a preferred embodiment of the invention the locking device has locking means with cut-outs and/or elevations which are arranged to mesh with a sleeve or the like on the pressure or return pipe socket and with the speed coupling spigots for the pressure and return pipes and a cut-out, slot or the like therein.

The cut-out, slot or the like in the speed coupling spigot may be suitably arranged in a ring, designed in the known manner, to be drawn back for release of the speed coupling spigot from the associated speed coupling socket.

Figure 2:
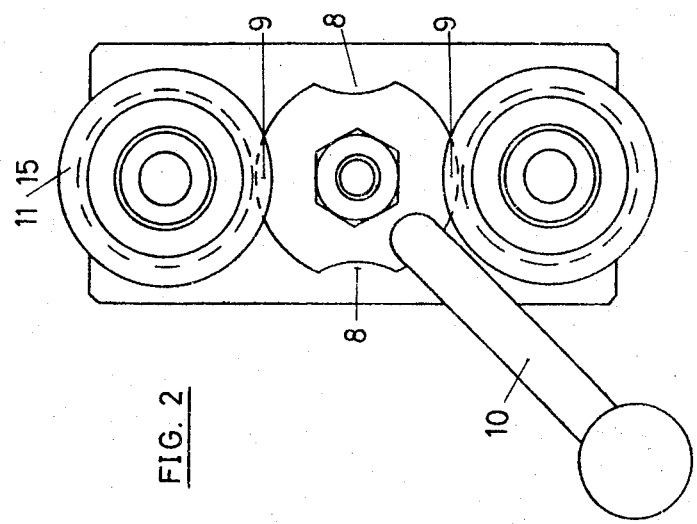

The invention will now be explained by means of an embodiment shown in the attached drawings, of which FIG. 1 shows, partially in cross-section, viewed from the side, an embodiment with connected plug-in couplings for pressure and return pipes, and a closed cut-off valve, FIG. 2 the embodiment of FIG. 1, viewed from in front, FIG. 3 the embodiment of FIG. 1 with uncoupled plug-in couplings for pressure and return pipes and with open cut-off valve, FIG. 4 the embodiment of FIG. 1, viewed from in front.

The embodiment of the invention according to the drawing exhibits a housing 1 with a channel for the suction or return pipe 2 and a channel for the pressure pipe 3. Between these channels there is in the housing 1 a communicating channel 4 leading to a cut-off valve 5. The cut-off valve 5 is furnished with an actuator 6 to which is coupled a locking device according to the invention.

The locking device has a locking means 7, here in the form of a disc, with cut-outs 8. Between these cut-outs 8 there are elevations 9. The locking device also has a lever 10 with which the cut-off valve 5 and the locking device can be set under given conditions referred to below.

The channels for the pressure and return pipes emerge on one side of the housing 1 for connection to fixed pipe bushings, fittings or the like (not shown in the drawing). On the opposite side of the housing in the drawing, i.e., on the side where the locking device as well is placed, these channels end up in speed coupling sockets 11 of known type. Each speed coupling socket 11 is furnished with a sleeve 13 retractable against the action of a spring 12.

The speed coupling sockets 11 are designed for connection to speed coupling spigots 14 for the preferably flexible pressure and return pipes, not shown on the drawing, which lead to the hydraulically driven device for coupling to fixed pipes.

These speed coupling spigots 14 may be essentially of the ordinary commercially available types. They are normally coupled to their associated speed coupling sockets by being simply pushed into them, thus opening the cut-off valve both of the socket and of the spigot. Uncoupling is done by pulling a ring 15 or the like arranged on the speed coupling spigot back against the action of a spring 17 releasing a ball lock or the like. In this ring 15, in the embodiment shown, there is a slot 16 along its periphery. The slot is of rather greater width than the elevations 9 in the locking means 7.

The object of the locking device according to the invention is to prevent closure of the open cut-off valve 5 if the speed coupling spigots 14 of both the pressure and return pipes are uncoupled from their respective speed coupling sockets 11. Furthermore, the locking device according to the invention prevents any speed coupling spigot from disengaging from its speed coupling socket before the cut-off valve opens. In the embodiment shown this is achieved as follows.

Figure 3:
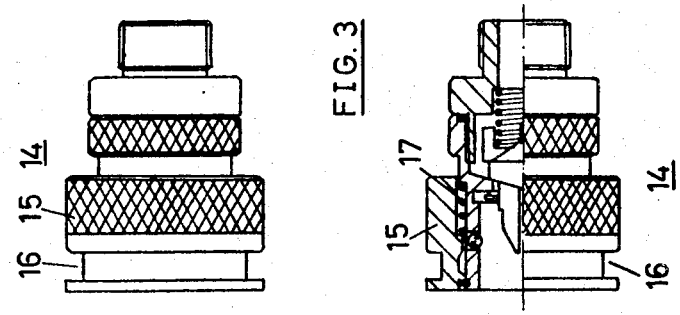
Figure 4:
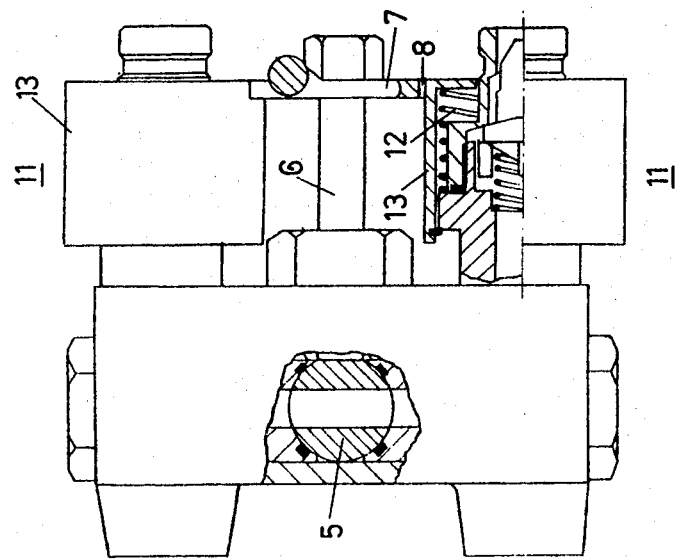
Figure 4:
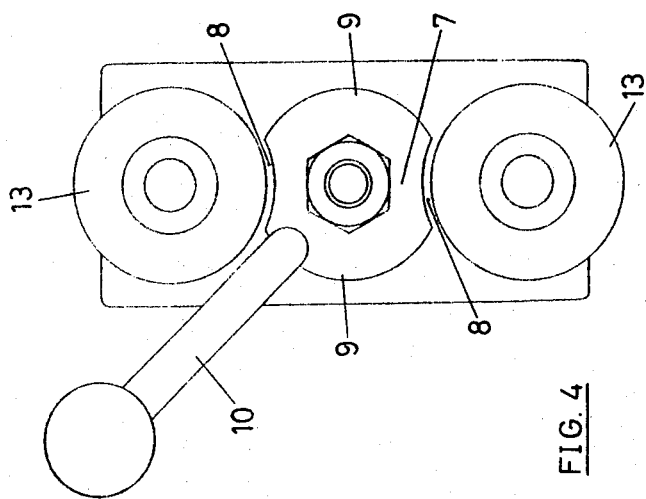

The cut-off valve is assumed to be open and no plug-in couplings are coupled together (FIGS. 3 and 4). The locking device then assumes a position in which the cut-outs 8 on the locking means 7 are in engagement with the two sleeves 13, projecting through the springs 12 on the speed coupling sockets 11. The lever 10, and so the actuator 6 for the cut-off valve 5, can therefore not be reversed. Further, neither can the lever and actuator be reversed if only one speed coupling spigot is coupled to one of the speed coupling sockets, in which case admittedly one sleeve 13 moves back, but the sleeve of the other speed coupling socket remains in engagement with the associated cut-out 8 and, thus, locks the cut-off valve in open position.

If, on the other hand, the other speed coupling spigot 14 as well is coupled to its associated speed coupling socket 11, none of the sleeves 13 are locked by the locking means 7. To ensure also that the rings 15 of the speed coupling spigot do not enter into engagement with the locking means in coupled position, each ring 15 has a slot 16 of suitable width. The cut-off valve can, thus, now be closed, and the connected apparatus driven by means of a working medium supplied to the pressure pipe.

The slot 16 has, however, still another function. As stated above, the device according to the invention has the object also of preventing disengagement of both speed coupling spigots 14 so long as the cut-off valve 5 is closed and to permit uncoupling only when the cut-off valve 5 is open.

This is achieved through the fact that the elevations 9 situated between the cut-outs 8 on the locking means 7 are in engagement with the slots 16 so long as the cut-off valve 5 is not entirely opened. Through this engagement of the elevations 9 in the slots 16 it is ensured that the rings 15 cannot be drawn backwards, i.e., that the speed coupling spigots 14 and speed coupling sockets 11 cannot be uncoupled.

Through this invention, accordingly, the initially mentioned drawbacks are precluded automatically in an advantageous and simple manner.

The connected hydraulic apparatus may also consist of only a single-acting hydraulic cylinder, and thus only one speed coupling spigot, which then serves to connect both for the pressure and return pipes to the hydraulic cylinder. In such case only one speed coupling socket is needed. Both a pressure pipe from the hydraulic pressure source and a separate return pipe to a hydraulic oil tank connect to this socket, the pipe preferably being openable and closable by a cut-off valve.

In such case the invention can be used in an analogous way, and the patent relates also to such embodiments. Although the invention has been described with reference to one of its embodiments, it can be arbitrarily varied within the scope of the claims.

1. A device for use in connecting hydraulic apparatuses to a pressure pump having a piping system or the like with pressure and return pipes, comprising:
   a speed coupling spigot connected to the pressure pipe;
   a speed coupling spigot connected to the return pipe;
   a speed coupling socket operatively engageable with said speed coupling spigot of said pressure pipe;
   a speed coupling socket operatively engageable with said speed coupling spigot of said return pipe;
   means defining a channel operatively communicating with both said pressure pipe and said return pipe;
   a cut-off valve disposed in said means defining said channel;
   an actuator operatively associated with said cut-off valve to selectively open and close said cut-off valve to allow and prevent a working fluid from flowing in said means defining said channel;
   locking means operatively associated with said actuator;
   said locking means being lockably engageable with at least one of said speed coupling sockets when said cut-off valve is in an open position and said coupling spigot is disengaged from its associated coupling socket to prevent said cut-off valve from being put into a closed position; and
   said locking means being lockably engageable with at least one of said speed coupling sockets when said coupling socket is operatively engaged with said coupling spigot and said cut-off valve is in the closed position to prevent said coupling spigot from disengaging from said coupling socket.

2. A device as defined in claim 1, wherein said locking means comprises:
   means defining at least one cut-out in said locking means, said cut-out being engageable with at least one of said speed coupling sockets when said cut-off valve is in an open position and said coupling spigot is disengaged from its associated coupling socket to prevent movement of said actuator thus preventing the closing of said cut-off valve.

3. A device as defined in claim 2 further comprising:
   a slot in a ring of each of said speed coupling spigots, said ring being a standard component of known speed coupling spigots being intended to be pulled away from said speed coupling socket to release said speed coupling spigot from said speed coupling socket; and
   said locking means being engageable in said slot when said cut-off valve is in a closed position and said speed coupling spigot is engaged with its respective speed coupling socket to prevent said speed coupling spigot from disengaging from its associated speed coupling socket while said cut-off valve is in the closed position.

4. A device as defined in claim 3, wherein said locking means further comprises:
   a rotatably mounted disc;
   means defining two cut-outs disposed opposite each other on the periphery of said disc, each cut-out being engageable with a different speed coupling socket;
   elevations disposed between said cut-outs in said disc, said elevations being engageable in said slots in said rings of said speed coupling spigots;
   a lever affixed to the disc to rotate the disc to selectively place said cut-off valve in the open and closed positions.

5. A device as defined in claim 4, wherein said locking means is disposed between a speed coupling socket associated with said pressure pipe and a speed coupling socket associated with said return pipe of said piping system.

* * * * *